(12) United States Patent
Solomon et al.

(10) Patent No.: US 7,062,607 B2
(45) Date of Patent: Jun. 13, 2006

(54) FILTERING BASIC INSTRUCTION SEGMENTS IN A PROCESSOR FRONT-END FOR POWER CONSERVATION

(75) Inventors: Baruch Solomon, Zichron Yaakov (IL); Ronny Ronen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 607 days.

(21) Appl. No.: 09/961,202

(22) Filed: Sep. 24, 2001

(65) Prior Publication Data

US 2003/0061469 A1    Mar. 27, 2003

(51) Int. Cl.
*G06F 12/08*    (2006.01)

(52) U.S. Cl. .................... 711/125; 711/118; 711/123; 711/128; 711/133; 711/134

(58) Field of Classification Search ............... 711/118, 711/123, 125, 128, 133–134, 135–136, 145, 711/200, 202, 203–205, 208
See application file for complete search history.

(56) References Cited

U.S. PATENT DOCUMENTS

| | | | |
|---|---|---|---|
| 4,575,814 A | | 3/1986 | Brooks, Jr. et al. |
| 5,381,533 A | | 1/1995 | Peleg et al. |
| 5,461,699 A | | 10/1995 | Arbabi et al. |
| 5,586,279 A | * | 12/1996 | Pardo et al. ................... 711/3 |
| 5,860,095 A | * | 1/1999 | Iacobovici et al. ......... 711/119 |
| 5,889,999 A | | 3/1999 | Breternitz, Jr. et al. |
| 5,913,223 A | | 6/1999 | Sheppard et al. |
| 5,924,092 A | | 7/1999 | Johnson |
| 5,966,541 A | | 10/1999 | Agarwal |
| 5,974,538 A | | 10/1999 | Wilmot, II |
| 6,000,006 A | * | 12/1999 | Bruce et al. ................ 711/103 |
| 6,073,213 A | | 6/2000 | Peled et al. |
| 6,076,144 A | | 6/2000 | Peled et al. |
| 6,185,675 B1 | | 2/2001 | Kranich et al. |
| 6,189,140 B1 | | 2/2001 | Madduri |
| 6,216,200 B1 | | 4/2001 | Yeager |
| 6,233,678 B1 | | 5/2001 | Bala |
| 6,279,103 B1 | | 8/2001 | Warren |
| 6,339,822 B1 | | 1/2002 | Miller |
| 6,351,844 B1 | | 2/2002 | Bala |
| 6,385,697 B1 | * | 5/2002 | Miyazaki ..................... 711/128 |
| 6,393,551 B1 | * | 5/2002 | Singh et al. ................. 712/214 |
| 6,412,050 B1 | * | 6/2002 | Jourdan et al. ............. 711/159 |
| 6,427,188 B1 | | 7/2002 | Lyon et al. |
| 6,470,425 B1 | * | 10/2002 | Yamashiroya ............... 711/133 |

(Continued)

OTHER PUBLICATIONS

The Block-Based Trace Cache, Published in May 1999 under Black, Bryan et al. at Department of Electrical and Computer Engineering Carnegie Mellon University in Pittsburgh.*

(Continued)

*Primary Examiner*—B. James Peikari
*Assistant Examiner*—Zhuo H. Li
(74) *Attorney, Agent, or Firm*—Kenyon & Kenyon

(57) ABSTRACT

Power conservation may be achieved in a front end system by disabling a segment builder unless program flow indicates a sufficient likelihood of segment reuse. Power normally spent in collecting decoded instructions, detecting segment beginning and end conditions and storing instruction segments is conserved by disabling those circuits that perform these functions. An access filter may maintain a running count of the number of times instructions are read from an instruction cache and may enable the segment construction and storage circuits if the running count meets or exceeds a predetermined threshold.

15 Claims, 4 Drawing Sheets

U.S. PATENT DOCUMENTS

| | | |
|---|---|---|
| 6,507,921 B1 | 1/2003 | Buser et al. |
| 6,535,959 B1 | 3/2003 | Ramprasad et al. |
| 6,681,297 B1 * | 1/2004 | Chauvel et al. ............. 711/130 |
| 2002/0078327 A1 | 6/2002 | Jourdan et al. |

OTHER PUBLICATIONS

Conte et al, "Optimization of Instruction Fetch Mechanisms for High Issue Rates," *Proceedings of the 22nd Annual Int'l. Symposium on Computer Architecture*, Jun. 22-24, 1995, Santa Margherita Ligure, Italy, pp. 333-344.

Dutta et al, "Control Flow Prediction with Tree-Like Subgraphs for Superscalar Processors," *Proceedings of the 28th Int'l. Symposium on Microarchitecture*, Nov. 29-Dec. 1, 1995, Ann Arbor, MI, pp. 258-263.

Hennessy et al., *Computer Organization and Design: the hardware/software interface*, 2nd Edition, Morgan Kaufmann Publishers, San Francisco, CA, 1998, p. 570.

Johnson, Mike, *Superscalar Microprocessor Design*, PTR Prentice-Hall, Englewood Cliffs, New Jersey, 1991, Chapter 10, pp. 177-202.

Jourdan et al, "eXtended Block Cache," Intel Corporation, Intel Israel, Haifa, 31015, Israel, pp. 1-10.

McFarling, Scott, "Combining Branch Predictors," Jun. 1993, WRL Technical Note TN-36, Digital Western Research Laboratory, Palo Alto, CA, 25 pp.

Michaud et al, "Exploring Instruction-Fetch Bandwidth Requirement in Wide-Issue Superscalar Processors," *Proceedings of the 1999 Int'l. Conference on Parallel Architectures and Compilation Techniques*, Oct. 12-16, 1999, Newport Beach, CA, pp. 2-10.

Patel et al, "Improving Trace Cache Effectiveness with Branch Promotion and Trace Packing," *Proceedings of the 25th Annual Int'l. Symposium on Computer Architecture*, Jun. 27-Jul. 1, 1998, Barcelona, Spain, pp. 262-271.

Reinman et al, "A Scalable Front-End Architecture for Fast Instruction Delivery," *Proceedings of the 26th Int'l. Symposium on Computer Architecture*, May 2-4, 1999, Atlanta, GA, pp. 234-245.

Rotenberg et al, "Trace Processors," *Proceedings of 30th Annual IEEE/ACM International Symposium on Microarchitecture*, Dec. 1, 1997, Research Triangle Park, NC, pp. 138-148.

Solomon et al., "Micro-Operation Cache: A Power Aware Frontend for Variable Instruction Length ISA," *ISLPED '01*, Aug. 6-7, 2001, Huntington Beach, CA, pp. 4-9.

Seznec et al, "Multiple-Block Ahead Branch Predictors," *Proceedings of the 7th Int'l. Conference on Architectural Support for Programming Languages and Operating Systems*, Oct. 1-4, 1996, Cambridge, MA, pp. 116-127.

Yeh et al, "Increasing the Instruction Fetch Rate via Multiple Branch Prediction and a Branch Address Cache," *Proceedings of the 7th Int'l. Conference on Supercomputing*, Jul. 1993, Tokyo, Japan, pp. 67-76.

Bellas et al, "Architectural and Compiler Techniques for Energy Reduction in High Performance Microprocessors", *IEEE Transactions on VLSI Systems*, vol. 8, No. 3, Jun. 2000.

Black et al, "The Block-Based Trace Cache", Proceedings of the 26th Intl. Symposium on Computer Architecture, IEEE Computer Society TCCA, ACM SIGARCH, Atlanta, Georgia, May 2-4, 1999.

Friendly et al, "Alternative Fetch and Issue Policies for the Trace Cache Fetch Mechanism", 30th Annual IEEE/ACM Intl. Symposium on Microarchitecture, Research Triangle Park, North Carolina, Dec. 1-3, 1997.

Intrater et al, "Performance Evaluation if a Decoded Instruction Cache for Variable Instruction-Length Computers", 19th Annual Intl. Symposium on Computer Architecture, Gold Coast, Australia, May 19-21, 1992.

Jacobson et al, "Path-Based Next Trace Prediction", 30th Annual IEEE/ACM Intl. Symposium on Microarchitecture, Research Triangle Park, North Carolina, Dec. 1-3, 1997.

Manne et al, "Pipeline Gating: Speculation Control for Energy Reduction", Proceedings, 25th Annual Intl. Symposium on Computer Architecture, IEEE Computer Society Tech. Comm. on Computer Architecture, ACM SIGARCH, Barcelona, Spain, Jun. 27-Jul. 1, 1998.

Glaskowsky, Peter N., "Pentium 4 (Partially) Previewed", *Microprocessor Report*, vol. 14, Archive 8, pp. 1, 11-13, Aug. 2000.

Papworth, David B., "Tuning the Pentium Pro Microarchitecture", *IEEE Micro*, IEEE Computer Society, vol. 16, No. 2, Apr. 1996.

Upton, Michael, "The Intel Pentium® 4 Processor", http://www.intel.com/pentium4, Oct. 2000.

Rotenberg et al, "Trace Cache: A Low Latency Approach to High Bandwidth Instruction Fetching", Proceedings, 29th Annual IEEE/ACM Intl. Symposium on Microarchitecture, MICRO-29, IEEE Computer Society Tech. Comm. on Microprogramming and Microarchitecture, Assn. for Computing Machinery SIGMICRO, Paris, France, Dec. 2-4, 1996.

Jourdan et al, eXtended Block Cache, Proceedings 6th Intl. Symposium on High-Performance Computer Architecture HPCA-6, Toulouse, France, Jan. 8-12, 2000.

* cited by examiner

200

1000

400

500

FILTERING BASIC INSTRUCTION SEGMENTS IN A PROCESSOR FRONT-END FOR POWER CONSERVATION

BACKGROUND

The present invention relates to a power conservation method in a processor.

FIG. 1 is a block diagram illustrating the process of program execution in a conventional processor. Program execution may include three stages: front end 110, execution 120 and memory 130. The front-end stage 110 performs instruction preprocessing. Front end processing 110 typically is designed with the goal of supplying valid decoded instructions to an execution core with low latency and high bandwidth. Front-end processing 110 can include branch prediction, decoding and renaming. As the name implies, the execution stage 120 performs instruction execution. The execution stage 120 typically communicates with a memory 130 to operate upon data stored therein.

FIG. 2 illustrates high-level processes that may occur in front-end processing. A front-end may store instructions in a memory, called an "instruction cache" 140. A variety of different instruction formats and storage schemes are known. In the more complex embodiment, instructions may have variable lengths (say, from 1 to 16 bytes in length) and they need not be aligned to any byte location in a cache line. Thus, a first stage of instruction decoding may involve instruction synchronization 150—identifying the locations and lengths of each instruction found in a line from the instruction cache. Instruction synchronization typically determines the location at which a first instruction begins and determines the location of other instructions iteratively, by determining the length of a current instruction and identifying the start of a subsequent instruction at the next byte following the conclusion of the current instruction. Once the instruction synchronization is completed, an instruction decoder 160 may generate micro-instructions from the instructions. These micro-instructions, also known as uops, may be provided to the execution unit 120 for execution.

Conventionally, front end processing 110 may build instruction segments from stored program instructions to reduce the latency of instruction decoding and to increase front-end bandwidth. Instruction segments are sequences of dynamically executed instructions that are assembled into logical units. The program instructions may have been assembled into the instruction segment from non-contiguous regions of an external memory space but, when they are assembled in the instruction segment, the instructions appear in program order. The instruction segment may include microinstructions (uops).

A trace is perhaps the most common type of instruction segment. Typically, a trace may begin with an instruction of any type. Traces have a single entry, multiple exit architecture. Instruction flow starts at the first instruction but may exit the trace at multiple points, depending on predictions made at branch instructions embedded within the trace. The trace may end when one of number of predetermined end conditions occurs, such as a trace size limit, the occurrence of a maximum number of conditional branches or the occurrence of an indirect branch or a return instruction. Traces typically are indexed by the address of the first instruction therein.

Other instruction segments are known. Intel engineers have proposed an instruction segment, which they call an "extended block," that has a different architecture than the trace. The extended block has a multiple-entry, single-exit architecture. Instruction flow may start at any point within an extended block but, when it enters the extended block, instruction flow must progress to a terminal instruction in the extended block. The extended block may terminate on a conditional branch, a return instruction or a size limit. The extended block may be indexed by the address of the last instruction therein. The extended block and methods for constructing them are described in Jourdan, et al., "eXtended Block Cache," HPCA-6 (January 2000).

A "basic block" is another example of an instruction segment. It is perhaps the most simple type of instruction segment available. The basic block may terminate on the occurrence of any kind of branch instruction including an unconditional branch. The basic block may be characterized by a single-entry, single-exit architecture. Typically, the basic block is indexed by the address of the first instruction therein.

Regardless of the type of instruction segment used in a processor 110, the instruction segment typically is stored in a segment cache 170 for later use. Reduced latency is achieved when program flow returns to the instruction segment because the instruction segment may store instructions already decoded into uops and assembled in program order. Uops from the instruction segments in the segment cache 170 may be furnished to the execution stage 120 faster than they could be furnished from different locations in an ordinary instruction cache 140.

Many instruction segments, once built and stored within a segment cache 170, are never used. This may occur, for example, because program flow does not return to the instructions from which the instruction segment was constructed. Some other instruction segments may be reused quite often. However, because a segment cache 170 may have a limited capacity (say, 1024 uops), low segment reuse causes even frequently-used instruction segments to be overwritten by other instruction segments before their useful life otherwise might conclude. Thus, with a high eviction rate in the segment cache 170, the advantages of instruction segments can be lost.

Conventionally, a front end stage 110 may include a segment builder 180 provided in communication with the instruction decoder 160 to capture decoded uops and build instruction segments therefrom. The segment builder 180 typically includes buffer memories to store the uops and a state machine to detect segment start and end conditions and to manage storage of instruction segments within the segment cache 170.

The techniques for implementation and management of instruction segments consume tremendous amounts of power. Power must be provided for the segment cache 170 and the segment builder 180. The segment cache 170 must be integrated with other front-end components, such as one or more branch predictors (not shown). And, of course, as implementation of instruction segments becomes more complex, for example, to employ concepts of traces or extended blocks, the power consumed by the circuits that implement them also may increase. By way of example, the front-end system of the IA-32 processors, products commercially available from Intel Corporation of Santa Clara, Calif., consumes about 28% of the overall processor power.

As mobile computing applications and others have evolved, raw processor performance no longer is the paramount consideration for processor designs. Modern designs endeavor to provide maximize processor performance within a given power envelope. Given the considerable amount of power spent in front-end processing, the inventors perceived a need in the art for a front end unit that employs power control techniques. It is believed that such front end units are unknown in the art.

DETAILED DESCRIPTION

Embodiments of the present invention introduce an access filter to a front end system for power conservation. The access filter may selectively enable or disable segment builders within the front end to ensure that only instruction segments that are likely to be reused by program flow will be stored in the segmentation cache, e.g. segment cache. Simulation studies suggest that many instruction segments, once stored in the segment cache, are never used. For example, one simulation suggested that up to 67% of all segment cache lines are replaced before being used even once in a simulated segment cache having 6 ways, 64 sets and 6 uops per set. Typically, a new instruction segment is built each time an IP miss occurs in the instruction segment cache. Program flow may not return to the IP that caused a miss in the segment cache or, even if it does return to the IP, the program flow may return after so much time that the instruction segment has been evicted from the segment cache in favor of newer instruction segments. In either case, the power spent in the process of building and storing the unused instruction segment is wasted without contributing to the performance of the front-end system. The techniques of the present embodiments help to ensure that power will be spent building instruction segments that are likely to be used.

Figure 1:
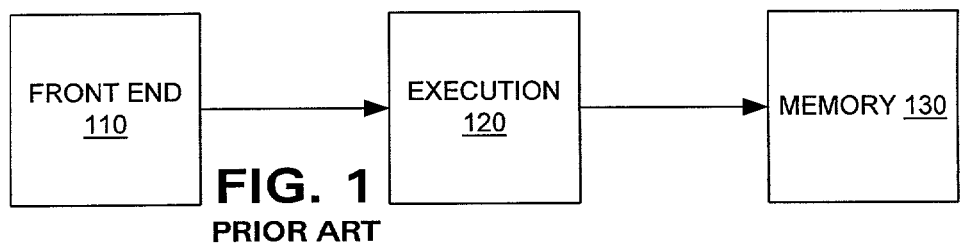
FIG. 1 is a block diagram illustrating the process of program execution in a conventional processor.
Figure 2:
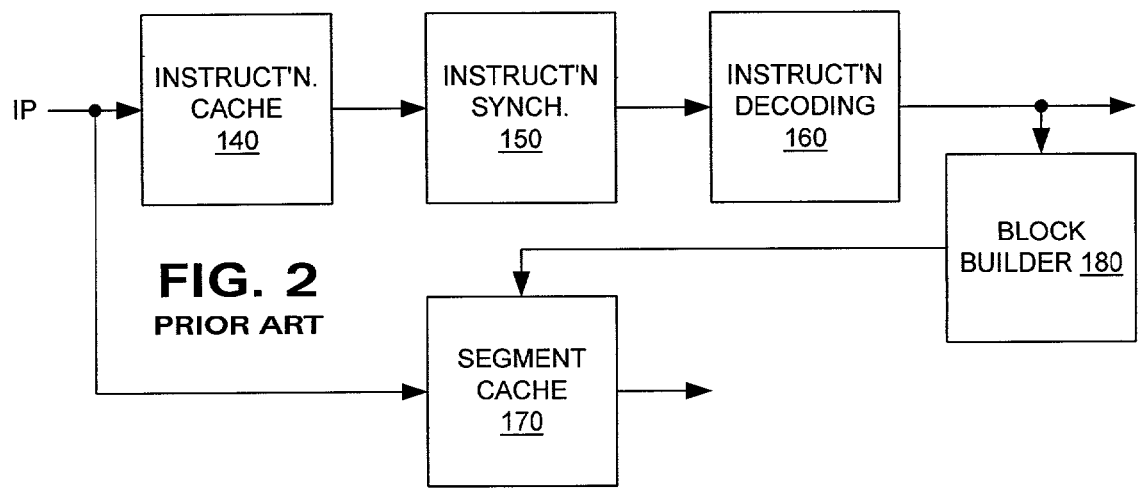
FIG. 2 illustrates high-level processes that may occur in front-end processing.
Figure 3:
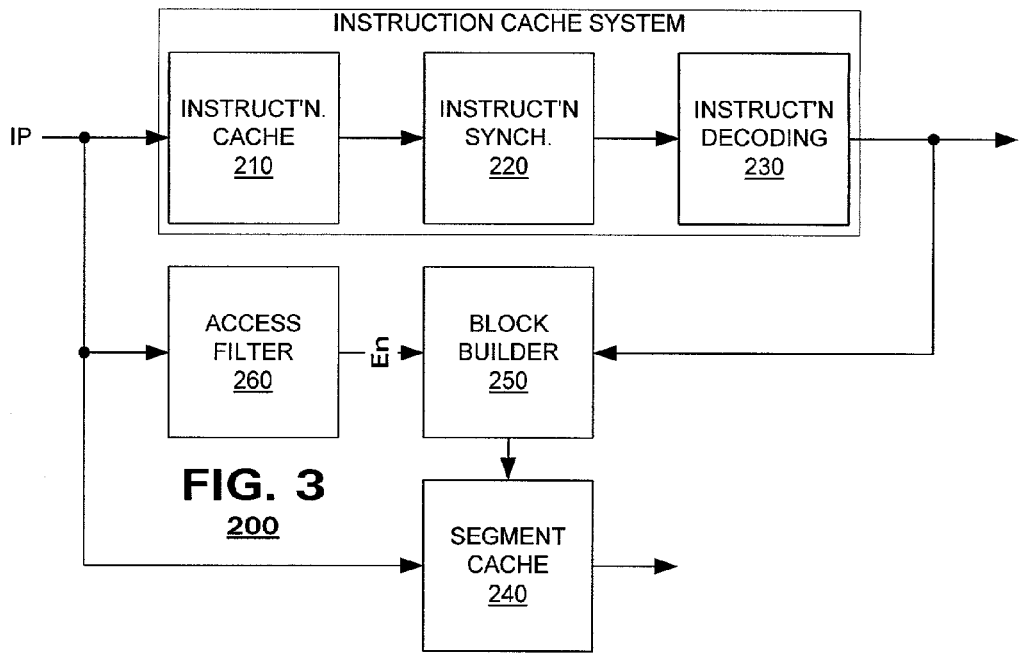
FIG. 3 illustrates a block diagram of a front-end unit according to an embodiment of the present invention.

FIG. 3 illustrates a front-end system 200 according to an embodiment of the present invention. This embodiment may include a segment cache 210, an instruction cache 220, an instruction synchronizer 230, an instruction decoder 240 and a segment builder 250. In this embodiment, power conservation may extend to the segment builder 250 by disabling it unless certain preconditions are met. An access filter 260 may enable or disable the segment builder 250. Disabling the segment builder 250, of course, conserves power.

Figure 4:
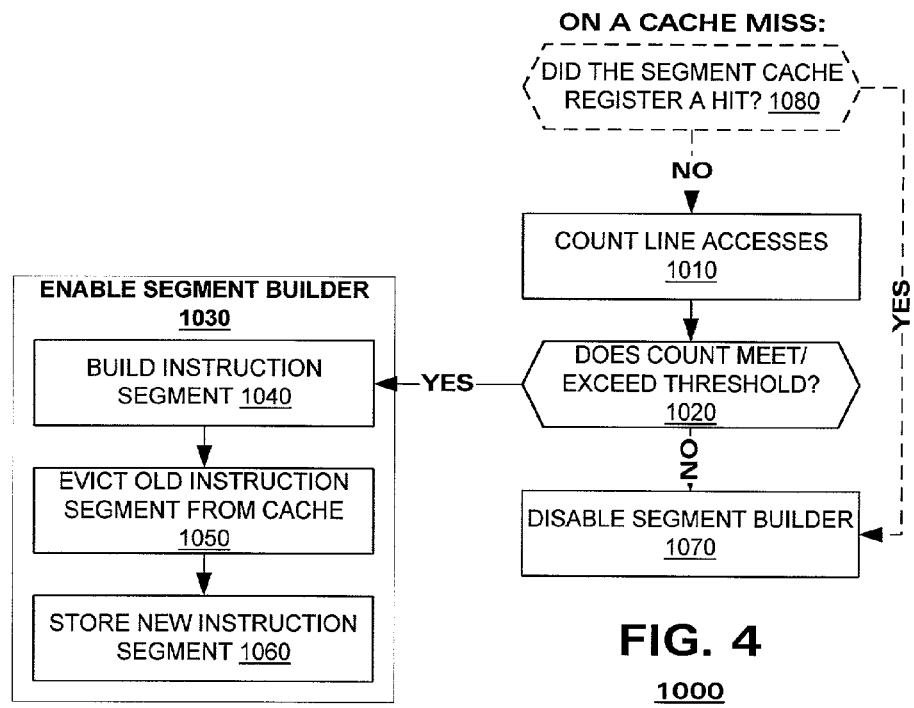
FIG. 4 illustrates a method according to an embodiment of the present invention.

FIG. 4 illustrates a method 1000 according to an embodiment of the present invention. According to the method, when a new IP is presented to and hits the instruction cache, the number of times that a cache line has been accessed may be counted (box 1010). The count is compared with a predetermined threshold to determine whether it meets or exceeds the threshold (box 1020). If so, then the segment builder may be enabled (box 1030). Enabling the segment builder may cause it to build an instruction segment by conventional techniques and to store the new instruction segment in the segment cache (boxes 1040, 1050). Storing the new instruction segment may cause eviction of an old instruction segment (box 1060). Building of instruction segments and storage and eviction of instruction segments from a segment cache is well known. If, at box 1020, the count did not meet or exceed the threshold, the segment builder may be maintained in a disabled state (box 1070).

In an embodiment of the invention, if the new IP hits the segment cache 240 the method 1000 may be aborted regardless of the value of the access count (box 1080). In the general case, a hit in the segment cache 240 may indicate that the segment cache 240 already stores an instruction segment responsive to the new IP. The segment builder 250 may be disabled to conserve power because the segment builder 250 could not generate a useful result in this circumstance.

A hit in the segment cache 240, however, need not disable the method 1000 in every event. As described in the Jourdan article, the multiple-entry, single-exit architecture of extended blocks permits the beginning of an extended block to be extended to include additional uops. In this embodiment, by threshold testing the access count regardless of a hit/miss response from the segment cache 240, the method may identify situations that are reasonably likely to cause an existing extended block to be extended. In such situations, it may be beneficial to enable the segment builder 250. The segment builder 250, operating according to the techniques disclosed in the above-referenced application, may enhance existing extended blocks as appropriate.

Figure 5:
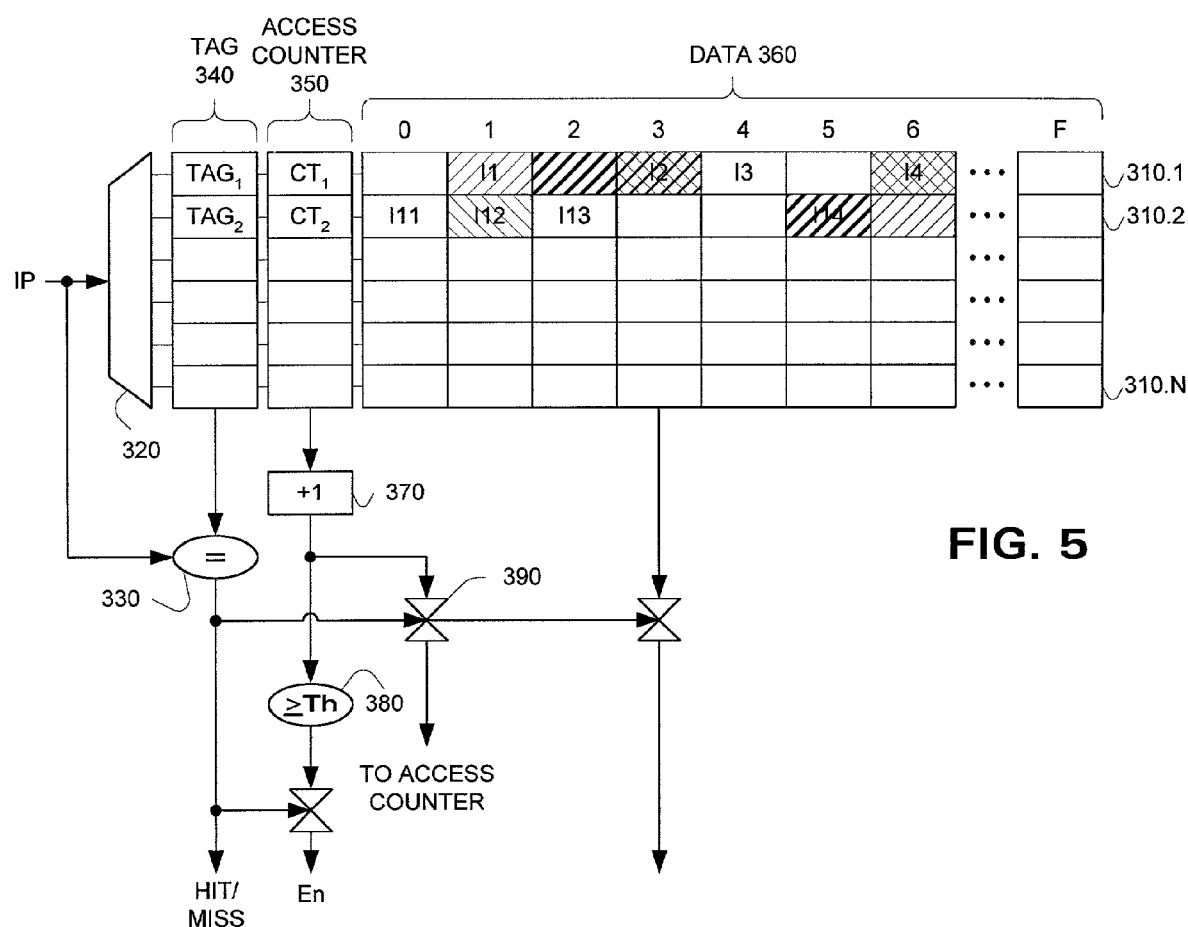
FIG. 5 is a block diagram of an instruction cache with the functionality of an access filter integrated therein according to an embodiment of the present invention.

FIG. 5 is a block diagram of an instruction cache 300 having integrated functionality of an access filter according to an embodiment of the present invention. The instruction cache 300 may be populated by a plurality of cache entries 310.1–310.N, an address decoder 320 and a comparator 330. Each cache line may include a tag field 340, an access count field 350 and a data field 360. The tag field 340 may store tag data representing an address of program instructions stored in the data field 360. The access count field 350 may store a count of the number of times data from the cache entry has been read from the cache 300.

In response to a new IP, the address decoder 320 may cause data from one of the cache entries 310.1–310.N to be driven on output lines. The comparator 330 may compare data from the tag field 340 to a portion of the new IP. If they match, the instruction cache 300 may register a hit. Otherwise, the IP misses the instruction cache 300.

Typically, when the address decoder 320 selects a cache line (say, line 310.1) in response to a new IP, the contents of the data field 360 may be driven toward an output of the gate. If the comparator 330 registers a hit, the contents of the data field 360 may propagate out of the instruction cache 300; otherwise, they are blocked. For example, the hit/miss indicator from the comparator 330 may control a transmission gate that communicates data from the data field 360 out of the cache 300.

In an embodiment, an access count field 350 may be provided in each cache entry 310.1–310.N for storage of a count value. The cache may include an incrementor 370 coupled to the access count fields 350 and a second comparator 380 coupled to the incrementor. When a cache entry (say, entry 310.1) is activated by the address decoder 320, data from the access count field 350 may be output to the incrementor 370. As its name implies, the incrementor 370 may increment the value of the count field. The incremented value may be threshold tested by the second comparator 380. An output of the second comparator may indicate whether the incremented count value meets or exceeds the threshold. The output may be output from the cache 300 as the enable signal.

The incremented count value may be stored back in the count field 350 of the cache entry 310.1 so long as the IP hits the cache. FIG. 5 illustrates a second gate 390, controlled by the hit/miss output from the tag comparator 330. If the incremented count value advances beyond the second gate 390, it may propagate to write circuitry within the cache 300 (not shown for clarity) and may be written back in the cache entry 310.1.

The threshold value Th may be tuned to meet design criteria of any system for which the present invention may be used. Typical threshold values are 1, 3 or 7, permitting the access count field to be one, two or three bit fields.

In an embodiment, the incrementor 370 may be provided as a saturating incrementor. If, by incrementing the access count value, it causes a carry out of the most significant bit position in that value, the access count value may be left unchanged.

In the embodiment shown in FIG. 5, the incrementor is shown provided in direct connection to the count fields 350 and the threshold comparator 380 shown coupled to the output of the incrementor 370. Of course, the interconnection of these units may be reversed in other embodiments. The threshold comparator 370 may compare the stored count value to a threshold and, if it meets or exceeds a threshold, the comparator may generate the enable signal therefrom. In this alternate embodiment (not shown), the incrementor 370 may increment the count value and store the result back in the respective access count field 350.

The foregoing description presents operation of the cache 300 when reading data therefrom. In an embodiment, the access counter may be cleared (e.g., set to zero) when new instructions are stored in the respective line of the instruction cache. Thus, when writing new data to a line 310.1 within the instruction cache 300 and possibly evicting old data therefrom, the contents of the access counter field 350 may be cleared. Techniques for writing data to an instruction cache and evicting data therefrom are well known.

Figure 6:
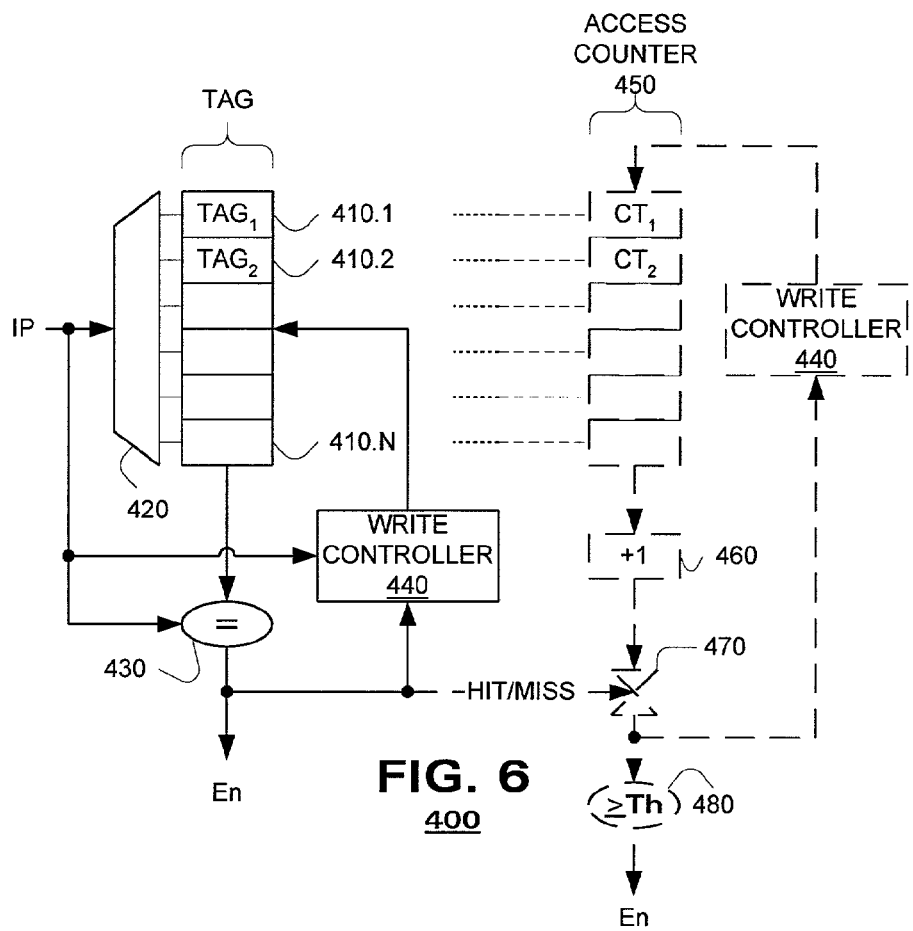
FIG. 6 illustrates an access filter according to an embodiment of the present invention.

The access filter need not be integrated with the instruction cache. FIG. 6 illustrates an access filter 400 according to an embodiment of the present invention. The access filter 400 may be populated by a plurality of filter entries 410.1.1–410.1.N, an address decoder 420, a tag comparator 430 and a write controller 440. In this embodiment, the cache entries 410.1–410.N may store only tag data.

During operation, when a new IP is applied to the address decoder 420, it may cause tag data to be output from an addressed entry (say, entry 410.1). If the tag data from the entry 410.1 matches tag information from the new IP, then a match may be registered. Otherwise, no match occurs. When no match occurs, the tag data from the new IP may be stored in the entry 410.1 via the write controller 440. The new tag data overwrites the tag data previously stored in the entry.

When a tag match occurs, it signifies that program flow has traversed a single IP twice. It also signifies that no other IP has been encountered to the same tag. Otherwise, the tag of the second IP would have overwritten the tag that caused the tag match. The hit/miss output generated by the tag comparator 730 may be used as an enable signal to control the segment builder 250 (FIG. 3).

Returning to FIG. 3, an access filter 260 may reduce the rate at which data is evicted from the segment cache. The access filter 260 may keep the segment builder 250 disabled until program flow exhibits a pattern in which it traverses a single IP multiple times. Once a pattern is exhibited, however, a new instruction segment may be stored in the segment cache 210. Data eviction in the cache 210 is reduced by requiring the same pattern to be exhibited (directed to the same set) before a second instruction segment is created. The first instruction segment remains valid until a second instruction segment is assembled and stored in cache locations formerly occupied by the first instruction segment. Thus, the access filter 260 may improve the useful life of an instruction segment.

In this embodiment, the access filter 400 operates with a threshold value of Th=2. The first time an IP is presented to the access filter, it causes a miss with previously stored tags and is written to an entry within the cache. The second time the IP is presented, assuming the tag has not been overwritten, a tag hit occurs and the segment builder 250 (FIG. 3) is enabled. Thus, this embodiment permits a threshold comparison to be made even though the embodiment does not store an access count value within the access filter 400.

Of course, the access filter 400 can include access count values in other embodiments. FIG. 6 illustrates in phantom access count fields 450 provided for each entry 410.1–410.N, an incrementor 460, a transmission gate 470 and a threshold comparator 480. When a new IP is applied to the address decoder 420, the count value from one of the count fields 450 may be output to the incrementor 460. If the tag comparator 430 registers a hit, an incremented count value may pass through the gate 470 to the threshold comparator 480. An output of the threshold comparator 480 may be output from this embodiment of the access filter 400 as an enable control signal. FIG. 6 also illustrates the incremented count value passing from the gate 470 to write controller 440 (shown in phantom to maintain clarity of presentation). Thus, the incremented count values may be stored back in the count fields 450 of the entry selected by the address decoder 420.

In other embodiments, an instruction cache 210 (FIG. 3) may be provided as a set associative cache. Set-associative caches are known per se. They typically include several arrays of cache entries (called "ways"), one entry from each way being a member of the same set. To implement the cache 300 of FIG. 4 as a set-associative cache, the structure shown in FIG. 4 may be duplicated for each of the ways in the cache. The cache may also include a cache manager (not shown), typically provided as a state machine, to manage victim selection and other elements of the cache's eviction policy.

Embodiments of the access filter 400 of FIG. 6 also may be provided in a set-associative fashion, duplicating the structure shown into multiple ways. Although it is possible to provide in the access filter one way for every way in the instruction cache, other embodiments permit fewer ways than are provided in the associated instruction cache. One of the advantages of the access filter is that, when an instruction segment is built and stored in the segment cache 240, it is unlikely to be evicted until program flow hits another conflicting IP repeatedly. Providing a large number of ways in the access filter 400 can cause a slow eviction rate among tags stored in the access filter which can correspondingly increase the eviction rate within the segment cache 240.

As described above, count values are a useful basis on which to predict instruction segments that have a high likelihood of reuse. Additional embodiments of the present invention can improve the prediction by de-emphasizing count values that may not demonstrate sufficient re-use to merit an instruction segment. In one embodiment, it may be sufficient to decrement or downshift counter values of all access counters periodically in an access filter. It may occur that some instructions are infrequently used when compared with other instructions in the instruction cache. These instructions, although infrequently used, may not be evicted by other instructions. Infrequent but regular use might otherwise cause an access counter to approach the threshold value that would cause an instruction segment to be built. However, in an embodiment that periodically decrements access counters, it would be less likely that an instruction segment would be built from an infrequently used cache line.

Figure 7:
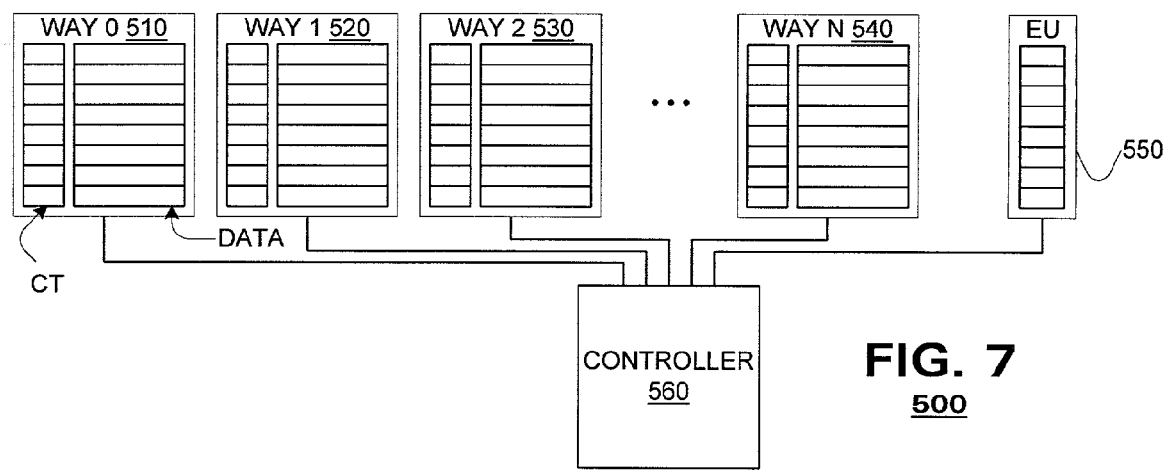
FIG. 7 is a block diagram of a cache according to an embodiment of the present invention.

Alternatively, decrementing or downshifting of access counters may occur individually for each cache line. FIG. 7 is a block diagram of a set-associative cache 500 according to an embodiment of the present invention. The cache 500 is shown with a plurality of ways 0–N, labeled 510–540, and an eviction unit (EU) 550. Each of the ways 510–540 may include a count field and a data field as discussed above. For each set in the cache 500, the EU 550 may store a pointer identifying a "victim way," a way that is the next candidate for eviction. The pointer may be established according to a least-recently-used (LRU) algorithm or some other conventional technique that monitors IPs input to the cache and determines which of the entries in the cache are not used. According to an embodiment, when the eviction pointer changes and points to a new victim way, the access counter within the victim way may be decremented or downshifted. Thus, even if the count value within a particular entry were nearing the threshold sufficient to trigger the construction of a new instruction segment, if program flow were accessing other ways in the set with such regularity that a way became the victim way, it may indicate that the instructions within the victim way are so useful as to merit a new instruction segment.

As is known, eviction units typically include an age matrix (not shown in FIG. 7) to implement the LRU algorithm. Instead of merely reducing an access counter of a new victim way (the "oldest" way in the set), the access counter may be reduced when a way passes the median age threshold of all ways in the set. Stated alternately, a count value may be reduced when a way passes the half-way mark between the most recently used way and the least recently used way in the set. In these latter embodiments, the "age" of a cache line represents the time since the cache line was most recently used, not necessary an absolute measure of all time in which the data resided in the cache line.

FIG. 7 illustrates a controller 560 to manage count values within the cache 500. Cache controllers 560 are known per se. Typically, they are provided as state machines. In an embodiment, a conventional cache controller 560 may be modified to integrate the functionality recited above into its overall operation.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A control method comprising, on a cache hit:
   counting a number of accesses to a cache line that caused the hit,
   if the count meets a predetermined threshold, enabling a segment builder,
   building and storing instruction segments from an output of the segment builder.

2. The control method of claim 1, further comprising maintaining the segment builder in an unpowered state except in response to the cache hit.

3. The control method of claim 1, further comprising, if a hit also is registered in a segment cache, maintaining the segment builder disabled regardless of the count value.

4. The control method of claim 1, further comprising incrementing the count value and storing the incremented count value in the cache line.

5. The control method of claim 1, further comprising:
   identifying a victim cache line, and
   reducing a count value of the victim cache line.

6. The control method of claim 1, further comprising:
   identifying an age of cache lines in a same set as the cache line that caused the hit, and
   reducing a count value of those cache lines that are older than a median age of all the cache lines in the same set.

7. An apparatus comprising:
   a cache including a cache line having an access count field to store a count of a number of accesses to the cache line;
   a comparator to determine whether the count meets or exceeds a predetermined threshold, and
   an enable signal to enable a segment builder based on the count meeting or exceeding the predetermined threshold, the segment builder to build and store instruction segments.

8. The apparatus of claim 7, further comprising an incrementor to increment the count.

9. The apparatus of claim 8, wherein the incrementor is a non-saturating incrementor.

10. The apparatus of claim 7, the cache line further including a data field.

11. The apparatus of claim 10, the cache line further including a tag field to store data representing an address of program instructions stored in the data field.

12. A system comprising;
    an instruction cache;
    an instruction segment builder; and
    an access filter, the access filter including logic to
       on a hit in the instruction cache, count a number of accesses to a cache line that caused the hit, and
       if the count meets or exceeds a predetermined threshold, enable the segment builder to build and store instruction segments.

13. The system of claim 12, further comprising a segment cache coupled to the segment builder.

14. The system of claim 12, further comprising an instruction synchronizer coupled to the instruction cache.

15. The system of claim 14, further comprising an instruction decoder coupled to the instruction synchronizer.

* * * * *